Figure 1:
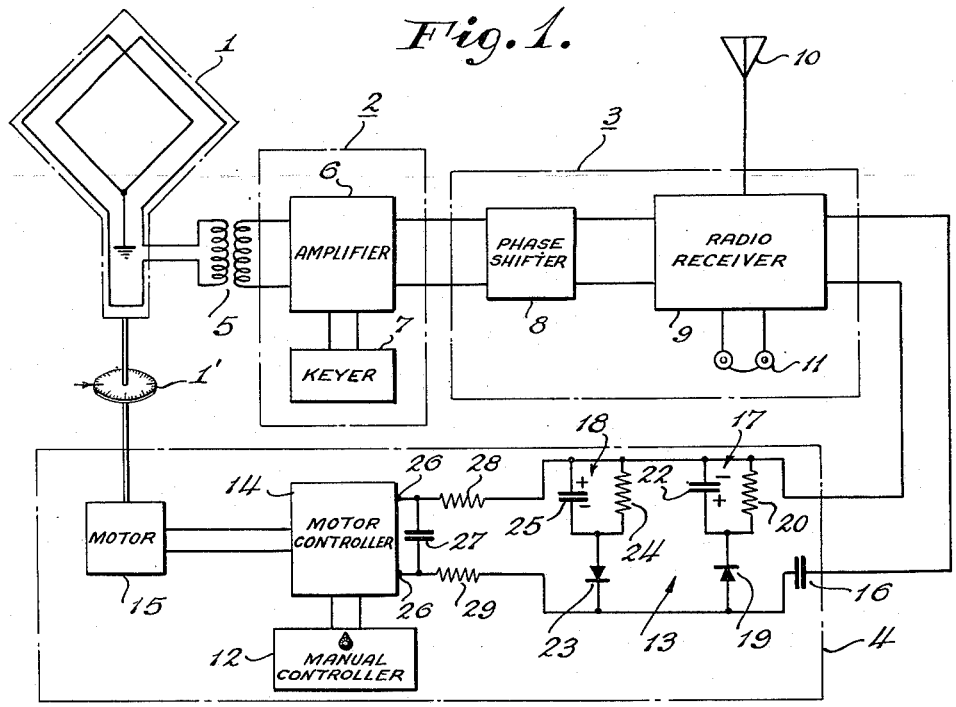

March 13, 1951     J. E. BROWDER     2,544,653
DIRECTION FINDER

Filed July 13, 1946     2 Sheets-Sheet 1

INVENTOR
JAY E. BROWDER
BY Paul B. Hunter
ATTORNEY

March 13, 1951   J. E. BROWDER   2,544,653
DIRECTION FINDER
Filed July 13, 1946   2 Sheets-Sheet 2
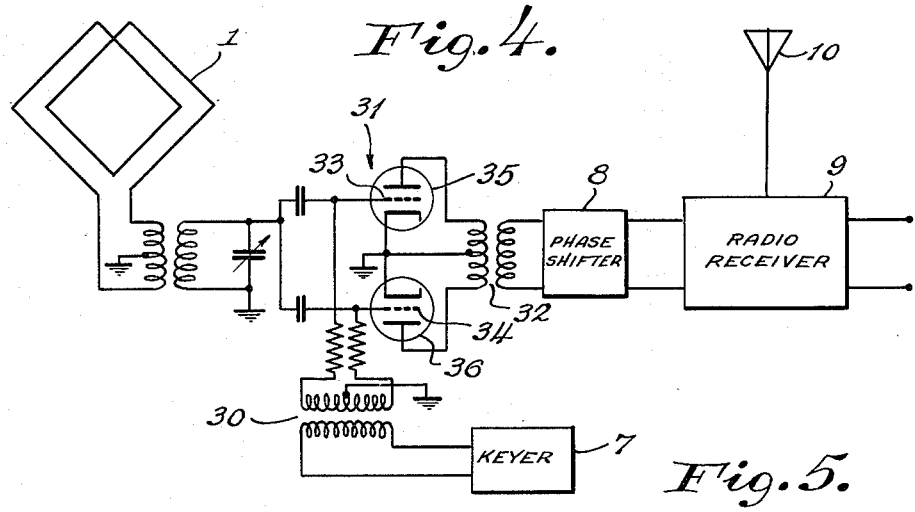
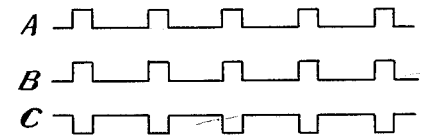
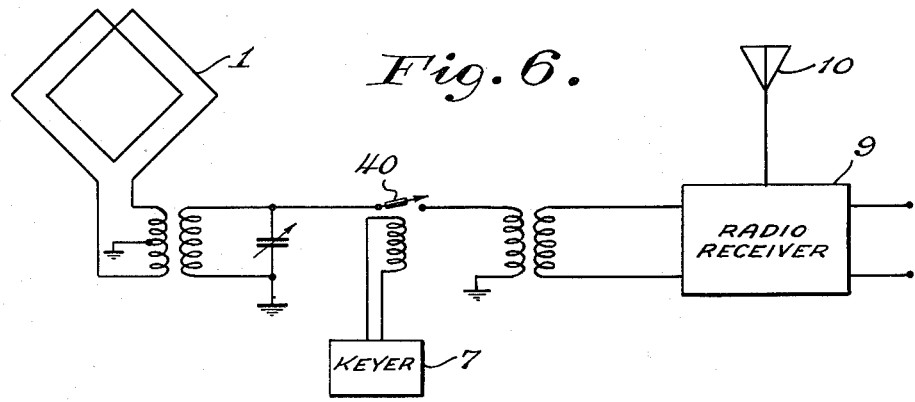
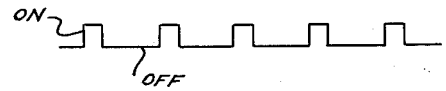
INVENTOR
JAY E. BROWDER
BY
ATTORNEY Patented Mar. 13, 1951

2,544,653

UNITED STATES PATENT OFFICE 2,544,653

DIRECTION FINDER

Jay E. Browder, Garden City, N. Y., assignor to The Sperry Corporation, a corporation of Delaware Application July 13, 1946, Serial No. 683,318

11 Claims. (Cl. 343—117)

This invention relates to radio direction finding apparatus and more particularly to direction finding apparatus in which the directional antenna is oriented automatically into angular correspondence with the direction of reception of the radio wave.

Direction finders of this type generally combine the outputs of a directional antenna and a second antenna in order to generate an error signal which may be used to rotate the directional antenna into angular correspondence with the direction of received energy. There are various systems now in use to combine the outputs of these two antennas and generate the said error signal, which systems utilize complicated modulation, demodulation and phase responsive circuits which are difficult to manufacture and keep in adjustment.

Accordingly, this invention is directed towards simpler means for combining these antenna outputs than are now in use. In addition, the present invention provides audible indications of the direction of loop deviation, whereby the loop may be manually operated if the automatic feature should fail.

According to one embodiment of the invention, the outputs of the directional antenna and the sense antenna are combined when they are either approximately in phase or 180° out of phase, depending upon the angular sense of the loop antenna error. They are combined after the directional antenna output has been asymmetrically keyed or modulated, so that the modulated radio frequency energy will either add to, or subtract from, the sense antenna output in an asymmetrical manner. This combined output is then detected and results in a voltage of asymmetrical form, for instance, a pulsed form, the polarity of the pulses depending upon the error sense and the magnitude on the error magnitude. This detected voltage is then applied to two opposing, peak voltage responsive rectifiers, one responsive to each polarity. Their output is a direct current differential voltage whose polarity depends upon the sense of the error angle and whose magnitude is a function of the amount of error. This direct current differential voltage is then applied to conventional motor control means for the purpose of rotating the antenna into unambiguous correspondence with the direction of the received energy.

The use of this system greatly simplifies the generation of an error signal, eliminating the need for complicated and critical phase-responsive components, and involved and complicated modulation systems such as have been heretofore used.

Accordingly, an object of this invention is to provide new and improved means of automatically rotating an antenna into angular correspondence with the direction of received energy without 180° ambiguity.

Another object of the present invention is to provide in a direction finder audible indications of the direction of angular error between the direction of received energy and the position of the antenna which are not ambiguous.

Another object is to generate in a simple manner an error voltage, the polarity of which indicates the direction of error and the magnitude of which indicates the amount of error.

Another object of the present invention is to provide new and simplified means of asymmetrically combining the outputs of the directional and second antennas for the purpose of generating an error signal, responsive to the asymmetrical combined outputs.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Figure 2:
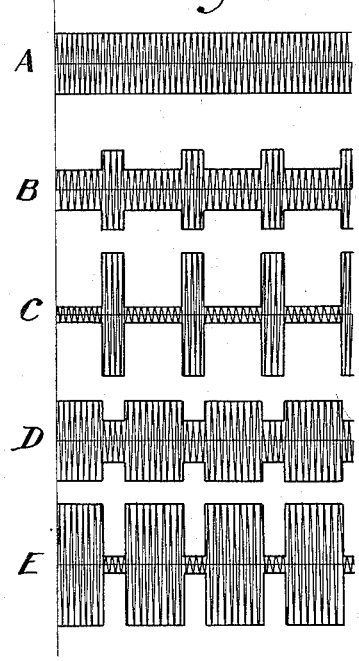
Figure 3:
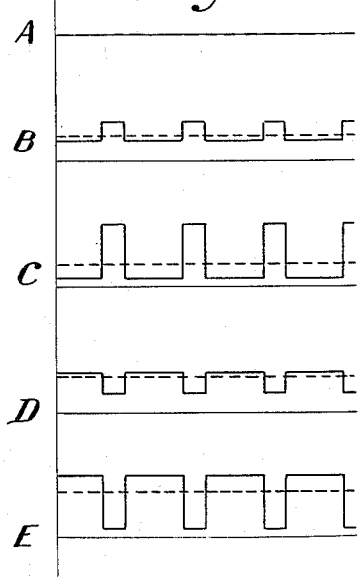

Other objects and advantages will become apparent from the specification, taken in connection with the accompanying drawings wherein, Fig. 1 is a diagrammatic representation of one embodiment of the invention;

Figs. 2 and 3 contain wave forms illustrative of the manner of operation;

Fig. 4 is a schematic diagram illustrative of a balanced method of keying;

Fig. 5 contains wave forms illustrative of a balanced method of keying;

Fig. 6 is a schematic diagram illustrative of an unbalanced method of keying; and Fig. 7 contains a wave form illustrative of an unbalanced method of keying.

Fig. 1 is a block diagram of one embodiment of the invention, wherein is shown a directional antenna 1, adapted to be rotated, which is mechanically connected to an azimuth indicator 1' and whose output is coupled through transformer 5 to amplitude modifying means illustrated as keying means which are shown in general at 2. The output of said keying means 2 is connected to combining means shown in general at 3, the output of which, in turn, is connected to antenna control means shown in general at 4.

The modulating or keying means 2 comprises amplifying means 6, the input of which is coupled to the output of the directional antenna through transformer 5 and which is adapted to be keyed by a keyer 7.

The amplitude modifying method may be by a balanced or an unbalanced modulating arrangement, as will be more fully described in connection with Figs. 4 and 6. The unbalanced method consists in rapidly connecting and disconnecting the output of the directional antenna and the combining means. The balanced method consists in rapidly reversing the output of the directional antenna with respect to the input of the combining means, but having an output connection substantially at all times.

The keying means here illustrated are merely one method of asymmetrically modifying the output of the directional antenna. Other methods of asymmetrically modifying or modulating, such as pulse modulation or modulation with a periodical, asymmetrical wave, may be used without departing from the scope of the invention. This may be accomplished by substituting for keyer 7 an alternating current source containing at least a fundamental and one harmonic, so as to produce a wave of unequal area on the opposite sides of its time axis.

The output of the amplifier 6 is connected to a phase-shifting means 8, which shifts the keyed output from directional antenna approximately 90° in phase. The output of the phase shifter 8 is connected to a radio receiver 9 whose input comprises the output of a second receiving antenna 10 as well as the said output of the phase shifter 8. Both antennas 1 and 10 are adapted to receive energy from the same transmitting source by suitable adjustments in the radio receiver 9.

The radio receiver 9 is adapted to combine and detect the radio energy from both antennas 1 and 10. The combined output of the receiver is connected to the input of the antenna control means 4, which comprises rectifying means shown in general at 13, motor control means 14, operatively connected to the output of the rectifying means, and motor means 15 connected to and adapted to be controlled by the motor control means 14 and mechanically adapted to rotate the directional antenna 1 in accordance with an actuating signal, supplied by the said motor control means 14.

Reference is made to Figs. 2 and 3 which show wave forms illustrative of the operation of the circuit of Fig. 1 which is as follows. Radio frequency energy, received on the directional antenna 1, is amplified and keyed or pulse-modulated by keying means 2, thus producing a radio frequency output which is characterized by a pulse wave-form envelope. This output is phase-shifted approximately 90° by the phase shifter 8 for a reason which will be more fully described hereafter. Radio frequency energy from the same source is received by antenna 10 and its constant amplitude output is combined with the keyed or pulse-modulated output of the directional antenna 1 in the combining means 3.

At the input of the combining means 3, the two inputs are either in phase, or 180° out of phase, depending upon the directional sense of the angular error between the position of the directional antenna 1 and the direction of received energy. This is so because, as is well known, the directional antenna output and sense antenna output are inherently 90° out of phase and the output of the directional antenna 1 has been further shifted approximately 90° by the phase shifter 8. The output of the directional antenna 1 has the property, as is well known, of changing its phase 180° as it is rotated from one side of the direction of the received energy to the other. These two inputs to the combining means will therefore either add or subtract, and due to the fact that one of them is keyed, their combined output will have a pulse form as shown in Fig. 2.

Referring to Fig. 2, there is shown in part A a representation of the constant radio frequency output of the second antenna 10. This representation is also equal to the combined outputs when the directional antenna 1 is in angular correspondence with the direction of the received energy, as in that position, the response of the directional antenna is null, and it will have no output. Therefore, when there is no angular error there will be no pulse type signal generated.

Part B of Fig. 2 shows the combined radio frequency output appearing in the receiver when the directional antenna 1 is pointing off to one side of the direction of received energy. In this case the two outputs have been added in phase producing a radio frequency voltage having a pulse train envelope.

Part C of Fig. 2 shows the combined radio frequency output when the directional antenna is pointing off further in the same direction as it was in part B of Fig. 2.

Part D of Fig. 2 shows the combined radio frequency output when the directional antenna is pointing off to the other side of the direction of the received energy than in parts B and C. In this case the two outputs have subtracted producing a radio frequency envelope pulse train which differs from that of parts B and C in that the amplitude of the narrow portions is less than that of the wide portions, in which condition, is opposite to that of the wave forms of parts B and C.

Part E of Fig. 2 shows the combined radio frequency output when the directional antenna is further off to the same side as it was in part D. These wave forms are illustrative of the output whether either the balanced or unbalanced keying method is used.

These combined voltages of Fig. 2 are then detected and the outputs of the combining means are voltage having pulse-type wave forms, that is, characterized by high intensity, flat top, peaks of either polarity separated by several pulse widths.

These detected voltages are as illustrated in Fig. 3. They correspond to the adjoining combined voltages of Fig. 2 from which they are derived. The dotted lines indicate the D. C. components of these voltages built up across capacitor 16, as will be more fully explained. It is noted that when the angular error is in one directional sense the pulses are positive and when it is in the other directional sense the pulses are negative.

These wave forms are then applied to the rectifying means shown in general at 13 in Fig. 1. The rectifying means comprises a coupling capacitor 16 connected in series in one side of the line and a pair of opposed, peak voltage responsive rectifying circuits 17 and 18 connected in parallel across the line. Peak voltage responsive circuit 17 comprises a rectifier 19 connected in series with an energy storage circuit, comprising a resistor 20 connected in parallel with a capacitor 22. The peak voltage responsive circuit 18 comprises a rectifier 23 connected in series with an energy storage circuit including a resistor 24 connected in parallel with a capacitor 25.

The resistances of resistors 20 and 24 are preferably equal, and similarly the capacitance values of capacitors 22 and 25 are preferably equal. The relative values of capacitance and resistance in the storage circuits are selected for a time constant which is appreciably greater than the pulse durations of the said pulse wave form.

Rectifiers 19 and 23 are connected in opposite conduction senses, in order that one of the rectifiers, that is, rectifier 19, will be responsive to positive peaks of the input voltage and the other, rectifier 23, will be responsive to the negative peaks of the same voltage. If an alternating voltage characterized by positive pulses is applied to the rectifying circuit 13, rectifier 19 will permit the flow of unidirectional charging currents to the storage circuit comprising resistor 20 and capacitor 22 during the positive peaks. As a result of these currents, there is maintained across storage circuit 17 a direct current voltage whose magnitude is approximately equal to the peak value of the positive pulses. Similarly, if a voltage characterized by negative pulses is applied to the rectifier circuit, rectifier 23 will permit the flow of unidirectional currents to the storage circuit 18 comprising resistor 24 and capacitor 25 and the storage circuit 18 will build up across capacitor 25 a direct current voltage approximately equal to the peak value of the negative pulses.

The voltage applied to the input of the rectifying circuit 13 tends to average about a direct current bias voltage built up across coupling capacitor 16 as illustrated in Fig. 3. Therefore, the amplitude of the shorter duration peaks will be higher than that of the longer duration peaks of the opposite polarity in inverse proportion to the ratio of time durations of the peaks of each polarity. This will be readily understood as consistent with the requirement that the time integration of the instantaneous positive values, of voltage in each cycle of the alternating voltage wave, must be equal to the time integration of the instantaneous negative values, of voltage in each cycle. Therefore, the input alternating voltage across circuits 17 and 18 will be averaged about a direct current voltage bias developed by capacitor 16 in accordance with the above. Circuits 17 and 18 are responsive to the amplitude and not the duration or power content of the pulses.

Rectifier 17 will generate a steady positive direct current voltage in response to, and proportional to, the positive pulses and rectifier 18 will generate a steady negative direct current voltage in response to, and proportional to, the negative pulses. The difference of these two opposing direct current voltages is applied to the input terminals 26 of the motor control circuit 14. The polarity of this input voltage depends upon the directional sense of the angular miscorrespondence error between the position of the directional antenna and the direction of the received energy, and the magnitude of this input voltage is proportional to the magnitude of said error. This voltage is then fed through a filter comprising capacitor 27 and resistors 28 and 29 to motor control means 14, the purpose being to filter out the keying voltage leaving only the direct current error voltage. Motor control means 14 may comprise any of a number of servo mechanisms that are well known to the art, and it is adapted, in response to the input voltage at terminals 26, to supply an actuating voltage to the motor 15 such as to cause the motor to rotate the directional antenna 1 into angular correspondence with the direction of received energy.

Audio output means 11 connected to receiver 9 are provided to give an audible indication of the direction and magnitude of the angular error of miscorrespondence between the direction of the antenna and the direction of received energy. The audio output means is responsive to a half-wave rectified version of the voltage wave forms of Fig. 3, i. e., the portion above the dotted lines. If the angular error is in one direction as in Fig. 3B, "dots" will be heard and if it is in the other direction, as in Fig. 3D, "dashes" will be heard. This audio feature enables manual operation of the equipment, even if the automatic feature fails, by means of manual motor control 12 which may be used by the operator.

Referring to Figs. 4 and 5, there is shown in Fig. 4 a circuit adapted to provide the keying operation referred to heretofore, and in Fig. 5, wave forms illustrative of the operation of the circuit. This circuit is illustrative of the balanced method of keying previously mentioned.

The circuit comprises keyer 7, operatively connected to a balanced modulator 31, the input of which is from the directional antenna 1 and the output of which is applied to the radio receiver 9 through transformer 32 and phase shifter 8. The keyer 7 may be a conventional-type pulse generator or an asymmetrical multivibrator, and its output comprises a pulse wave form similar to that shown in part A of Fig. 5. This output is coupled through transformer 30, the center tap of whose secondary is grounded, to the grids 33 and 34 of vacuum tubes 35 and 36, respectively, which tubes constitute a balanced modulator, thereby keying the output of the directional antenna 1 in a push-pull manner. By a push-pull manner is meant, that when one vacuum tube is conducting, the other is cut off as illustrated in parts B and C of Fig. 5, part B being a wave form applied to grid 33 through tube 35 and part C of Fig. 5 being the wave form applied to grid 34 through tube 36.

It will be seen that when a positive pulse is applied to grid 33 causing tube 35 to conduct, a negative pulse is applied at the same time to grid 34 thus cutting off tube 36. Therefore, the effect of the balanced keyer is to reverse in phase 180°, the output from directional antenna 1, twice each cycle of the repetition rate of keyer 7. This keyed output is applied through transformer 32 to radio receiver 9, previously mentioned, where it is combined with the output from the second or sense antenna 10, adding to the sense antenna output during the part of the cycle when it is in phase, and subtracting from it during the part of the cycle when it is 180° out of phase.

The circuit of Fig. 6 is illustrative of the unbalanced method of keying previously mentioned, and the wave forms of Fig. 7 are illustrative of the operation of the circuit in Fig. 6. The circut of Fig. 6 comprises a keyer 7 adapted to operate relay means 40, which are adapted to alternately connect the directional output to, and disconnect it from, the radio receiver 9 in response to the keying output of the keyer 7.

In Fig. 7, there is shown the keyer output voltage whereby the relay contact is made only on the short positive pulses, thus connecting the output of antenna 1 to the radio receiver 9 only during the short positive pulses. If desired, the relay may be adapted to connect the output of antenna 1 to the radio receiver 9 only during the long negative pulses.

This unbalanced method of keying has the advantage of being much simpler than the balanced method, eliminating the need for a balanced keying circuit, and keyer 7 may be a simple vibrator, whereas the balanced method has the advantage of being more stable in operation.

Since many changes could be made in the above construction and many apparently widely different embodiments of this invention could be made without departing from the scpoe thereof, it is intended that all matter contained in the above description or shown in the accompanying drawings shall be interpreted as illustrative and not in a limiting sense.

What is claimed is:

1. In a radio direction finding system, a first rotatable directionally responsive wave collector, a second wave collector responsive to the same waves as said first wave collector, combining means for periodically combining the response of said first wave collector with the response of said second wave collector for a portion of a period other than one half, and balanced peak voltage responsive rectifying means responsive to said combined responses for providing a signal having a polarity and amplitude in accordance with the sense and magnitude of the angular divergence of said first wave collector from a position of null response.

2. In a radio direction finder system, a rotatable directional antenna, keying means adapted to asymmetrically key the output of the said directional antenna, a second receiving antenna responsive to the same transmitting source as the said directional antenna, combining means responsive to both antennas to produce a signal indicative of the sense and magnitude of the angular divergence of the directional antenna from the direction of the received energy, and antenna control means comprising opposed peak rectifying means responsive to said combined output for rotating the said directional energy toward the direction of the received energy.

3. In a radio direction finder system, a rotatable directional antenna, means adapted to periodically modify the output of the said directional antenna for a time other than one half cycle, a second receiving antenna, combining means responsive to both antennas, and antenna control means responsive to the said combined output, and including polarity responsive opposed rectifying means for rotating the said directional antenna unambiguously to the direction of the received energy.

4. In a radio direction finder system, a rotatable directional antenna, a second receiving antenna, combining means responsive to both antennas, means for alternately coupling and uncoupling said directional antenna and said combining means for unequal periodical intervals, antenna control means comprising opposed peak voltage responsive rectifying means responsive to the said combined output for rotating said directional antenna toward the position of null response.

5. In a radio direction finder system, a shiftable directional antenna, a second receiving antenna responsive to the same transmitting source as the directional antenna, combining means responsive to both antennas to produce a pulse type signal of polarity and amplitude in accordance with the sense and magnitude of the angular divergence between the null position of said directional antenna and the direction of received energy, and peak voltage responsive control means responsive to the said combined output for shifting the null position of said directional antenna unambiguously toward the direction of the received energy.

6. In a radio direction finder system, a rotatable directional antenna, a second antenna responsive to the same source as the directional antenna, keying means comprising a pulse generator and a balanced modulator arranged to pulse modulate the output of the directional antenna, combining means responsive to both antenna outputs to thereby produce a pulsed output, and opposed peak voltage responsive rectifying means, responsive to the said combined output to produce a differential direct current signal having a polarity and amplitude in accordance with the sense and direction of the angular divergence of the said directional antenna from the direction of the received energy.

7. In a radio direction finder system, a directional antenna, means adapted to asymmetrically modulate the output of the said directional antenna, a second antenna adapted to receive from the same source as the directional antenna, combining means responsive to both antennas to produce an asymmetrical alternating voltage, rectifying means comprising a pair of opposed peak voltage responsive circuits responsive to the said combining means, the first of the said peak voltage responsive circuits being arranged to detect the positive peak strength, and the second being arranged to detect the negative peak strength of the alternating voltage output of the said combining means, the difference of the positive and negative peak strength of the output voltage providing a measure of the angular divergence between the position of the said directional antenna and the direction of received radio energy, and control means responsive to the said difference voltage.

8. In a radio direction finder system, a directional antenna, keying means adapted to asymmetrically key the output of the said directional antenna, a second receiving antenna, both antennas being adapted to receive from the same transmitting source, combining means responsive to both antennas to algebraically add their outputs and provide an alternating voltage, rectifying means responsive to the said combining means comprising first and second peak voltage responsive circuits for comparing the alternating output peak voltage of one polarity with the alternating output peak voltage of the opposite polarity and providing a differential direct current voltage proportional to the difference of the said peak voltages and having polarity and amplitude in accordance with the sense and magnitude of the angular divergence of the position of the said directional antenna from the direction of received energy.

9. In a radio direction finder system, a rotatable directional antenna, a second antenna, both antennas being adapted to receive from the same transmitting source, combining means responsive to both antennas for providing an asymmetrical alternating voltage indicative of the sense and magnitude of the angular divergence between the directional antenna and the direction of the received energy, rectifying means responsive to the said combining means comprising a first and second rectifier, the conductive directions of the first and second rectifiers being fixed for current conductance at opposite polarity voltage peaks, and first and second rectified energy storage circuits each comprising a capacitor connected in parallel with a resistor and respectively connected to the first and second rectifiers for receiving rectified current and biasing said rectifiers substantially to the peak voltage values of the said alternating voltage, said rectifying means thereby producing a voltage having polarity and amplitude in accordance with the sense and magnitude of the angular divergence between the position of the directional antenna and the direction of the received energy.

10. A guidance system comprising a directional antenna, keying means adapted to key the output of the said directional antenna periodically and asymmetrically, a second antenna adapted to receive from the same transmitting source as the directional antenna, combining means responsive to both antennas to algebraically add their output, and control means responsive to the said combined output comprising opposed peak voltage responsive rectifying means adapted to yield a guidance signal.

11. In a radio direction finding system, a first rotatable directionally responsive wave collector, a second wave collector responsive to the same waves as said first wave collector, combining means for periodically combining the response of said first wave collector with the response of said second wave collector, peak voltage responsive rectifying means responsive to said combined responses for providing a signal having a polarity and amplitude in accordance with the sense and magnitude of the angular divergence of said first wave collector from a position of null response, and a direction indicator controlled from said signal.

JAY E. BROWDER.

REFERENCES CITED

The following references are of record in the file of this patent:

UNITED STATES PATENTS

| Number | Name | Date |
|---|---|---|
| 2,054,160 | Leib | Sept. 15, 1936 |
| 2,170,659 | Kramar | Aug. 22, 1939 |
| 2,198,445 | Wesselink | Apr. 23, 1940 |
| 2,276,235 | Lamb | Mar. 10, 1942 |
| 2,356,922 | Eltgroth | Aug. 29, 1944 |
| 2,397,128 | Cole et al. | Mar. 26, 1946 |
| 2,420,395 | Greene | May 13, 1947 |

FOREIGN PATENTS

| Number | Country | Date |
|---|---|---|
| 524,653 | Great Britain | Aug. 12, 1940 |